United States Patent
Fielden (12)

(10) Patent No.: US 6,314,283 B1
(45) Date of Patent: *Nov. 6, 2001

(54) CELLULAR PHONE SUBSIDY LOCK

(75) Inventor: Ronald L. Fielden, Irving, TX (US)

(73) Assignee: NEC America, Inc., Melville, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,954

(22) Filed: Apr. 28, 1999

(51) Int. Cl.[7] .................................................. H04M 1/66
(52) U.S. Cl. ............................................ 455/411; 455/410
(58) Field of Search ................................. 455/410, 411, 455/418, 515, 419, 420

(56) References Cited

U.S. PATENT DOCUMENTS

| | | |
|---|---|---|
| 4,843,385 | 6/1989 | Borras . |
| 5,046,125 * | 9/1991 | Takizawa ............................. 455/26.1 |
| 5,257,412 | 10/1993 | Tomioka et al. . |
| 5,259,018 | 11/1993 | Grimmett et al. . |
| 5,301,223 * | 4/1994 | Amadon et al. ....................... 379/58 |
| 5,315,638 | 5/1994 | Mukari . |
| 5,414,753 | 5/1995 | Ehara . |
| 5,444,764 | 8/1995 | Galecki . |
| 5,485,505 | 1/1996 | Norman et al. . |
| 5,517,554 * | 5/1996 | Mitchell et al. ....................... 379/59 |
| 5,600,708 | 2/1997 | Meche et al. . |
| 5,633,914 | 5/1997 | Rosa . |
| 5,673,306 * | 9/1997 | Amadon et al. ....................... 379/59 |
| 5,796,338 * | 8/1998 | Mardirossian ....................... 340/568 |
| 5,864,757 | 1/1999 | Parker . |
| 6,047,071 * | 4/2000 | Shah ..................................... 380/273 |
| 6,085,083 * | 7/2000 | Lamb ..................................... 455/410 |
| 6,124,799 * | 9/2000 | Parker ............................. 340/825.34 |
| 6,151,493 * | 11/2000 | Sasakura et al. ..................... 455/421 |
| 6,159,547 * | 2/2001 | Corrivean et al. ................... 455/419 |

* cited by examiner

Primary Examiner—Reinhard Eisenzopf
Assistant Examiner—Naghmeh Mehrpour
(74) Attorney, Agent, or Firm—Scully, Scott, Murphy & Presser

(57) ABSTRACT

A cellular phone subsidy lock which ensures that a cellular phone, sold to an end-user at a price subsidized by a cellular carrier, is activated only on the subsidizing carrier's network, and not on a competitor's network. A secure carrier code, specific to and known by the subsidizing carrier, is programed into the cellular phone by the phone manufacturer. The phone is programmed and shipped by the manufacturer in a locked condition, which prevents programming of the NAM (Number Assignment Module) of the cellular phone without first entering either a valid unlock code or a valid remove lock code. At the time of phone activation and programming of the NAM, the phone's ESN (Electronic Serial Number) is entered into the carrier computer system, which utilizes the ESN and carrier code to execute a subsidy lock algorithm which outputs an unlock code and a remove lock code. At the carrier's choice, either code is given to the end user to be entered into the phone. The phone then executes the same subsidy lock algorithm, using the carrier code programmed at the time of manufacture, and it's own ESN, to calculate the unlock code and the remove lock code. If the code entered by the user matches the unlock code, NAM programming is allowed to proceed only once, and if the entered number matches the remove lock code, the phone removes the subsidy lock completely.

11 Claims, 2 Drawing Sheets

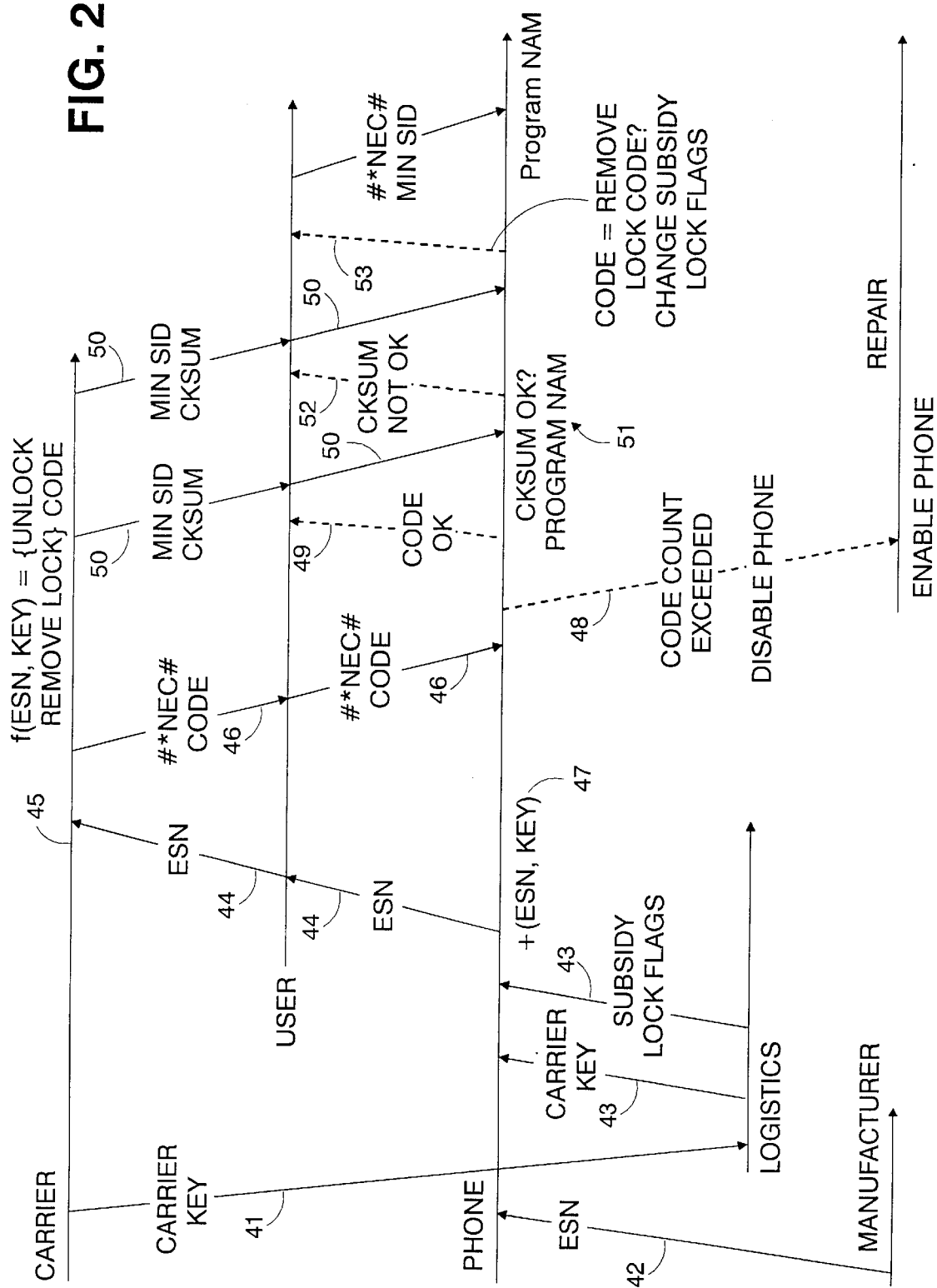

CELLULAR PHONE SUBSIDY LOCK

BACKGROUND OF THE INVENTION

1. Field of the Invention

The present invention relates generally to a cellular phone subsidy lock, and more particularly pertains to a cellular phone subsidy lock which ensures that a cellular phone, sold to an end-user at a price subsidized by a cellular carrier, is activated only on the subsidizing carrier's network, and not on a competitor's network, particularly where the competitor's network likewise implements a different subsidy lock methodology.

2. Discussion of the Prior Art

The following acronyms and definitions are used throughout this patent application:

- Carrier Code—code specific to one carrier;
- CKSUM—Checksum for error checking;
- GIM—Group Identification Mark;
- ESN—Electronic Serial Number;
- MIN—Mobile Identification Number (cellular phone number);
- NAM—Number Assignment Module (programmed with many parameters required to operate a cellular phone such as ESN, GIM, MIN, SID, SOC);
- SID—System Identification Number (carrier identifier);
- SOC—System Operator Code, In known cellular communication systems, a subscriber or user typically purchases a mobile communication phone or hand held phone or cellular phone which provides the user with access to the cellular communication system. When the user purchases the cellular phone, the phone is assigned a mobile identification number (MIN). When operating, the phone uses its previously programmed electronic serial number (ESN) and its MIN to identify itself to the cellular communication system or network (e.g. Cellular One, Bell Atlantic, etc.), and therefore, such numbers identify the user for billing and other purposes.

The Number Assignment Module (NAM) of a cellular phone stores information regarding the cellular phone, such as the MIN, the ESN, a country code, at least one SID, an optional password, and the like. Much of the information stored within the NAM is required for the cellular phone to access the carrier's system or network.

Cellular phone carriers frequently provide subsidized cellular phones to customers. As an example, a subscriber customer or end user would obtain a subsidized phone in return for a promise of continued usage of a phone system's service for a predetermined duration of time or subsidy period.

Various vendors have implemented specific methodologies regarding what procedures to implement in regards to maintaining the subsidized phone for the predetermined duration or the subsidy period.

For instance, in U.S. Pat. No. 5,864,757, issued to John P. Parker on Jan. 26, 1999, and assigned to BellSouth Corporation, there is disclosed an apparatus and method for locking and unlocking mobile telecommunication handsets or other devices.

Another such system is disclosed and described in U.S. Pat. No. 5,444,764, issued to Dawn M. Galecki on Aug. 22, 1995, and assigned to Motorola, wherein a SIM card is inserted into a radiophone for providing subscriber identification data.

For a manufacturer of a cellular phone, however, their phones may be sold to various service providers or carriers. Consequently, it would be advantageous to provide a single subsidy lock system which could be capable of implementing various phone carriers subsidy lock algorithms or methodologies or implement a subsidy lock disable or remove feature for those carriers that do not have or do not choose to use a subsidy lock algorithm or methodology.

In the carrier systems which implement a subsidy lock algorithm or methodology, it is also advantageous to enable the cellular phone for an unspecified time but terminable at a future time when used on the subsidized cellular carrier's system to thereby ensure that the subsidizing carrier receives compensation for the user's purchase of a cellular phone. Therefore, at the option of the subsidizing carrier, the subsidy lock can either be entirely disabled or only accessed so that an activation of the phone can occur.

SUMMARY OF THE INVENTION

Accordingly, it is a primary object of the present invention to provide a cellular phone subsidy lock which ensures that a cellular phone, sold to an end-user at a price subsidized by a cellular carrier, can be initially activated only on the subsidizing carrier's network, and not on a competitor's network. Although designed particularly for an analog cellular phone, any analog or digital wireless phone (AMPS, TDMA, CDMA, GSM) can use the present invention.

It is also an object of this invention to provide a method of accessing a particular carrier's subsidy lock algorithm within the cellular phone itself.

The present invention provides a factory enabled option to ship a cellular phone in a locked state, which ensures that all activations of the phone are by the appropriate subsidizing carrier and not by unauthorized users and other carriers. Moreover, a phone provided with a subsidy lock can be disabled by the subsidizing carrier at any time.

A further object of the subject invention is the provision of a cellular phone subsidy lock in which the carrier utilizes a subsidy lock algorithm, which is capable of being implemented in software on a computer system maintained by the carrier. A secure carrier code, specific to and known by the subsidizing carrier, is programmed into the cellular phone by the phone manufacturer. The phone is programmed and shipped by the manufacturer in a locked condition, which prevents programming of any NAM (Number Assignment Module) of the cellular phone without first entering either a valid unlock code or a remove lock code, entered via the phone keypad.

At the time of phone activation and programming of a NAM, the phone's ESN (Electronic Serial Number) is entered into the carrier computer system, which executes the subsidy lock algorithm. The algorithm takes the carrier code and ESN as inputs, and outputs an unlock code and a remove lock code.

At the carrier's choice, either code may be given to the end user to be entered into the phone. The phone then executes the same subsidy lock algorithm using the carrier code programmed at the time of manufacture and the phone's own ESN, to calculate an unlock code and a remove lock code. If the code entered by the user does not match either the unlock code-or remove lock code, the phone prevents NAM programming from proceeding. If the entered code matches the unlock code, NAM programming is allowed to successfully proceed only once, and when completed the phone remains in or returns to a locked condition. If the entered code matches the remove lock code, NAM programming is allowed to proceed, and when completed the phone removes or disables the subsidy lock and goes into an unlocked condition, thereby allowing further NAM programming without entry of a subsidy lock code.

In accordance with the teachings herein, the present invention provides a solution to the following requirements:

- a front-end requirement ensures that the initial activation (NAM programming) is performed only on one of the purchasing carrier's systems;
- a back-end requirement ensures that once the initial activation programming is successfully completed with the unlock code, and the subsidy lock has not been removed or disabled, subsequent activations may be performed only by a repetition of the same steps;
- the process is secure against another carrier attempting to reprogram the subsidized phone;
- a carrier is able to disable the subsidy lock to allow subsequent activations without entry of a code;
- a phone is still allowed to roam;
- the subsidy lock is easy for carriers to implement for all phones from one manufacturer;
- the subsidy lock feature provides two choices to optionally implement during manufacture, (1) implement no subsidy lock restriction on activation, or (2) implement a subsidy lock restriction for all activations, until disabled or removed.

BRIEF DESCRIPTION OF THE DRAWINGS

The foregoing objects and advantages of the present invention for a cellular phone subsidy lock may be more readily understood by one skilled in the art with reference to the following detailed description of several preferred embodiments thereof, taken in conjunction with the accompanying drawings wherein like elements are designated by identical reference numerals throughout the several figures, and in which:

FIG. 2 illustrates a system flow diagram for a subsidy lock with short NAM programming.

DETAILED DESCRIPTION OF THE EMBODIMENTS

Figure 1:
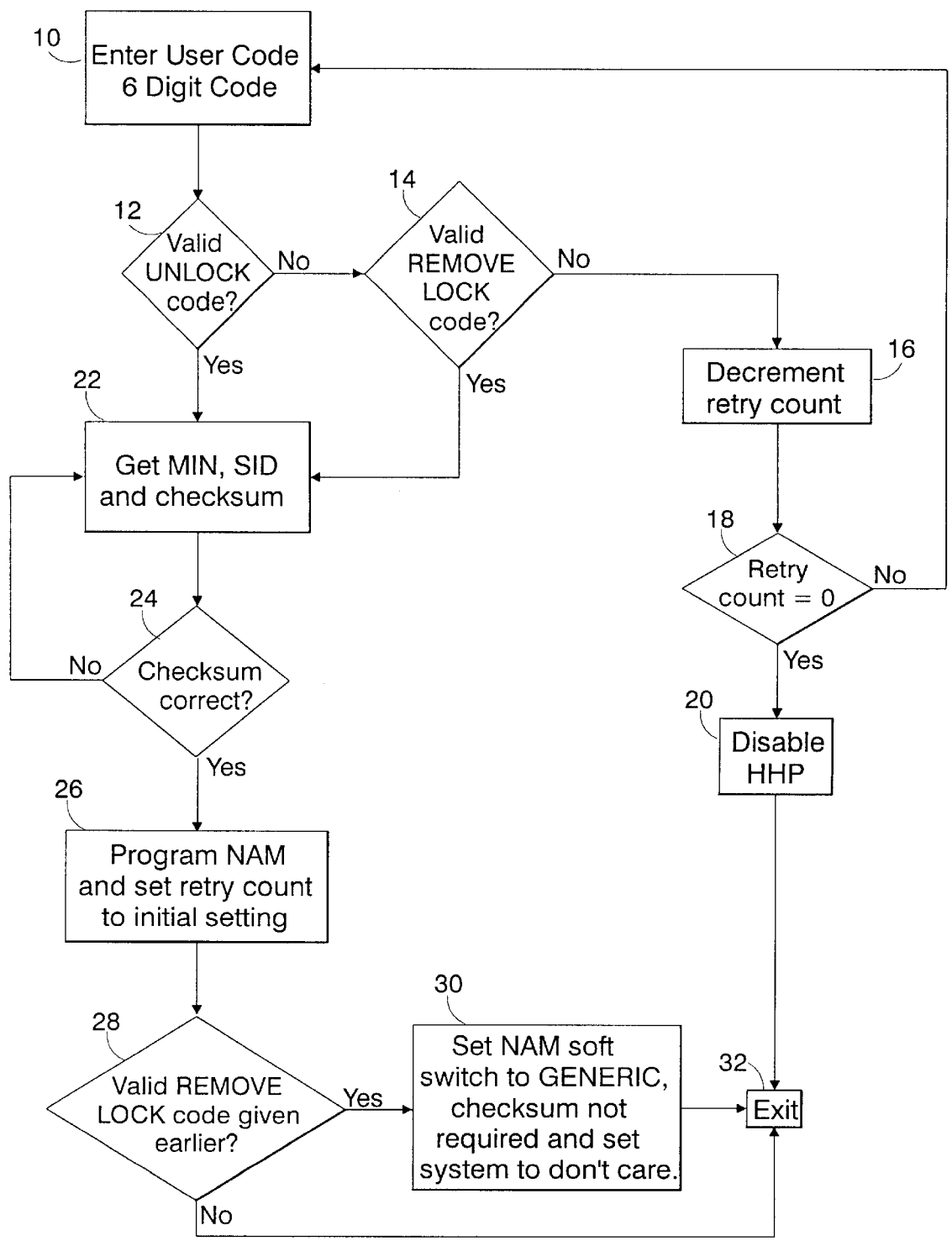
FIG. 1 is a functional logic flow chart of a first preferred embodiment of a subsidy lock NAM program.

In a first preferred embodiment of the present invention for an unlock and disable/remove subsidy lock, a cellular phone is factory programmed by the manufacturer with a carrier code and a subsidy lock algorithm to generate an unlock code and a remove code. In order to access the carrier's algorithm, a carrier specific entry sequence is keyed into the phone, thereby accessing the specific carrier's algorithm within the phone.

Typically, in order to begin the process of NAM programming of a cellular phone, an code is entered into the phone using methods which are presently known in the art of data entry into phones, for example, as by manual keying of the code or by electrical transmission of data such that the code is transmitted from the carrier. Thereafter, the code is compared to another code generated entirely within the cellular phone by using the phone's ESN and a stored carrier code as inputs to the phone's subsidy lock algorithm.

In general, in the present invention, a carrier generated unlock code and a remove lock code are calculated (using the particular carrier's subsidy lock algorithm) prior to the calculation of an unlock code or remove lock code generated within the cellular phone. The cellular phone uses a carrier's specific entry sequence to allow access and running of the carrier's specific algorithm. In the preferred embodiment of this invention, the entering of a specific carrier's entry sequence (such as #ID#) (by using the cellular phone's keypad or other data entry means such as by electrical or optical transmission) or another carrier associated sequence (such as #ID#) is used to identify the subsidy lock algorithm associated with the particular carrier who has purchased the cellular phone from the manufacturer and then directly or indirectly sold and/or subsidized the purchase of the cellular phone to the end user. Once a proper carrier sequence is entered or keyed in, NAM programming continues by using the algorithm of the particular carrier to generate either a remove lock code or a unlock code or both.

Alternatively, the keyed in carrier sequence could be transmitted by the particular carrier to the cellular phone being activated. Such transmission of data is known in the art, and the prior activation procedure (including writing the NAM) is typically referred to as over-the-air (OTA) activation. Usually, the data transfer for implementing the NAM writing process is done by using data transfer methods which are specified by the type of carrier system the activating phone is transmitting to and from. These system historically have been analog, but time division multiple access (TDMA) systems and code division multiple access (CDMA) systems are becoming more available.

Typically, the keyed in carrier sequence for a specific carrier will be known by others as well as the manufacturer and the particular carrier. However, the specific algorithm and carrier coded used by the particular carrier to generate an unlock code will be known only to the manufacturer and the particular carrier. By permitting the keying sequence of each carrier to be known, various customized or standard configurations of phones can be implemented or manufactured without the need for separately programming each group of phones scheduled for production and/or delivery to a particular carrier or purchaser.

It is also necessary to permit NAM programming of the phone to proceed where the phone is capable of being subsidy locked, but where the subsidy lock feature has not been enabled or is no longer enabled. As is presently well known, a NAM can be programmed in short NAM programming mode or in long NAM programming mode. An entry key sequence may now be used to access either the short or long NAM programming mode. In phones of the present invention, one or more manufacturer's entry codes are implemented which permit either long or short NAM programming, thereby selecting (or running) a NAM programming procedure which does not implement any subsidy lock algorithm. The specific carrier sequence to enable short NAM programming is #MAN#, and the specific key entry sequence to enable long NAM programming is #MANL#. The actual key entry sequences described herein are for illustration and clarity, and any unique carrier identifying sequence can be used. Where possible, for short NAM programming, carrier names abbreviated by one or more keypad strokes are preferred as they are typically unique.

In an analog cellular phone, upon entry into NAM programming (short or long), if the subsidy lock flag or feature is enabled, to activate the phone on a carrier's network, the end-user must contact the carrier to begin the phone activation process. For an analog phone, the end-user can read the manufacturer's ESN to a carrier representative who inputs that ESN into a computer. The computer, programmed with the subsidy lock algorithm and the carrier code, determines a calculated unlock code and a calculated remove lock code.

To calculate the unlock and remove lock codes, the computer combines the phone's ESN with the carrier's code, and produces an unlock code and a remove lock code. The carrier's representative selects and provides one of the codes to the end-user, who then keys the code into the phone. The phone compares the inputted code with the internally generated codes, and if there is a match, NAM programming is allowed to proceed. Where there is not a match, of either the unlock code or remove lock code, an attempt counter is decremented. If the number of unsuccessful attempts reaches or exceeds a fixed value, the phone disables further NAM programming, which then requires the phone to be returned to the carrier or the manufacturer for service.

A second embodiment operates by data transmission between the carrier transmitting data to the cellular phone, without keying of any user inputted data. Upon contact by the end-user with the subsidizing carrier, the carrier enters the carrier sequence thereby permitting activation of the phone by completing NAM programming entirely using over the air data transmission. Such a method is functional and also preferred because the manual intervention by the end-user is limited but still requires the gathering of additional information regarding the end-user, such as billing information, payment information, etc. In addition, this method does provide a more automated process whereby carriers who activate numerous phones over a short period of time can accommodate and activate as many end-user phones as possible.

The subsidy lock of the first embodiment and the second embodiment have many similarities. The subsidy lock ensures that a subsidizing carrier is the only carrier able to program the first NAM of the phone, and the phone's software prevents unauthorized additional NAM programming until such time as the subsidy lock is removed or disabled.

Before the phone is purchased by the end-user, the particular carrier code of the purchasing carrier is installed into the phone such that it may be read by the phone itself. The carrier code is utilized with the phone's subsidy lock algorithm to generate an unlock code and a remove lock code to verify the code entered by an end-user (or transmitted by the carrier) to allow the continuation of activation by NAM programming.

FIG. 1 is a functional logic flow chart of a first preferred embodiment of a subsidy lock NAM program in which a user enters an unlock code, at block 10. A determination is made at 12 whether the entered user code is a valid unlock code. If not a valid unlock code, a determination is made at 14 whether the entered unlock code is a valid remove lock code. If not, the logic flow enters a loop in which a retry counter is decremented at 16, and a determination is made at 18 as to whether the retry count equals 0. If a subsequent invalid code is entered, the program cycles through loop 10, 12, 14, 16 and 18 for each entered invalid code until the retry count at 18 is 0, and then disables the hand held phone at 20, which requires a return of the phone for service.

If a valid unlock code determination or a valid remove lock code determination is made at respectively 12 or 14, then the MIN, the SID and error checksum digits are supplied by the carrier and entered into the cellular phone, Using the MIN, the SID and the error checksum digits, a calculation is made by the cellular phone to determine if the data entered is correct. If the checksum is incorrect at 24, the program recycles through steps shown at 22 and 24 until the error checksum is correct, and then proceeds at 26 to programming of the NAM (Number Assignment Module) and resetting of the retry count (used at 18) to an initial setting (e.g. 5). A determination is made at 28 if a valid remove lock code was identified at 14, and if so, at 30 sets the program for GENERIC (short NAM) programming, and then exits the program at 32. If a valid remove lock code was not entered as determined at 28, the program exits at 32 without removing or disabling the subsidy lock system.

FIG. 2 illustrates a system flow diagram for a subsidy lock with short NAM programming. The following steps 41 through 53 correspond to the steps numbered 41 through 53 in FIG. 2.

41. The carrier selects a secret carrier code and sends the carrier code to the manufacturer where it is stored in a computer. The carrier code will be used on all future purchase orders from that carrier requiring a subsidy lock.

42. At the time of manufacture, an ESN (electronic serial number) is programmed into the phone at the manufacturer.

43. At the time of a purchase order, the manufacturer programs the carrier code, and sets the subsidy lock flag for short NAM programming in the phone, which also disables all other multi-NAM programming such as a NAM2 (NAM2 programming is known in the art as a second NAM designating a second MIN used for minimizing roaming charges). All regular NAM programming (full programming of the NAM which can program the NAM with multiple parameters, as is known in the art) is likewise disabled.

44. After purchase, the user calls the carrier to activate the phone, and reads the ESN off the phone to the carrier representative.

45. The carrier representative inputs the ESN into a computer, which then runs the carrier's algorithm using the known carrier code, to produce both an unlock code and a remove lock code.

46. The carrier representative instructs the user to key in an entry sequence (e.g. #NEC#) followed by one of the unlock code or remove lock code. The choice of which code is distributed is determined by carrier and:

the carrier wants the user to call back or contact the carrier in order to change the NAM at any future time, the unlock code is given; or, if the carrier does not want the user to call back or not contact the carrier for any future NAM changes, the remove lock code is given.

47. The phone also runs the encoding algorithm based on the secret carrier code and the ESN to generate an unlock code and a remove lock code. The user entered input code is checked to determine if it matches either of the internally generated unlock or remove lock codes.

48. If the user entered input code doesn't match either of the correct codes, a counter is decremented and checked. If a count limit is exceeded, the phone disables itself, and can only be fixed by returning it to the manufacturer.

49. If the user input code matches either the unlock or remove lock codes, the counter is reset to an input count and the phone prompts the user for the cellular Mobile Identification Number (MIN).

50. The carrier instructs the user to key in the MIN, SID and a CheckSum data.

51. The phone determines whether or not the MIN and SID are correct by calculating a checksum and comparing it to the checksum entered by the user. If it is correct, the phone then programs the NAM using the MIN and SID data.

52. If the checksum is not correct, the phone reprompts for entry of the cellular MIN, SID and checksum data. The above two steps are repeated until the checksums match.

53. If the code inputted by the user matches the remove lock code calculated by the phone, the phone resets the subsidy lock flag such that any future NAM programming attempt only requires an input of the manufacturer's access sequence (e.g. #MAN#), a MIN and a SID. No lock code is now required. Multi-NAM programming routines are likewise enabled for programming and operation without the subsidy lock code. Where the unlock code was inputted, no change is made to either subsidy lock flag or multi-NAM programming routines.

The pseudo code set forth in the following APPENDIX is one preferred embodiment of a subsidy lock algorithm for calculating an unlock code or a remove lock code from a carrier code and a phone's ESN. There are three components:

a) ESN of phone;

b) CARRIER CODE, which can be a six digit code fixed in all phones for a specified carrier; and, c) USER CODE (unlock code or remove lock codes), which can be a six digit code which is computed from the algorithm, and is entered by the user.

While several embodiments and variations of the present invention for a cellular phone subsidy lock are described in detail herein, it should be apparent that the disclosure and teachings of the present invention will suggest alternative designs to those skilled in the art.

What is claimed is:

1. A method of processing a cellular phone having a subsidy lock option to ensure that the cellular phone, sold to an end-user at a price subsidized by a carrier, is activated for use only on a network of the carrier, comprising:

a. agreeing between the carrier and a manufacturer upon a carrier code associated with the carrier and upon a subsidy lock algorithm associated with the carrier;

b. storing by the manufacturer the carrier code into a memory of the cellular phone and programming the subsidy lock algorithm into the cellular phone;

c. placing an order by the carrier with the manufacturer for the purchase of subsidy locked cellular phones, wherein the manufacturer sets a subsidy lock flag which places the cellular phone in a locked condition thereby preventing programming of a number assignment module (NAM) of the cellular phone;

d. activating the cellular phone for use by the end-user by:

1. executing the subsidy lock algorithm on a computer of the carrier using an electronic serial number (ESN) of the cellular phone and the carrier code for generating either an unlock code or a remove lock code or both;

2. Entering into the cellular phone an entry sequence and either the unlock code or remove lock code, wherein the cellular phone calculates a calculated unlock code or a calculated remove lock code or both, and compares the entered code to the calculated unlock code or the calculated remove lock code or both, and upon a match of the entered code and the calculated remove lock code or the calculated unlock code, permits NAM programming to proceed; and 3. programming the NAM to enable the cellular phone to be used on the carrier's network.

2. The method of claim 1, wherein after the step of programming the NAM, the cellular phone confirms that the NAM programming has completed successfully; and thereafter compares the entered code to the calculated remove lock code, and if the entered code and the remove lock code match, then the cellular phone removes the subsidy lock flag set by the manufacturer, thereby enabling additional NAM programming.

3. The method of claim 1, wherein the step of entering the ESN of the cellular phone includes entering only place specified digits of the cellular phone's ESN for use by the algorithm.

4. The method of claim 1, wherein the step of entering the carrier code of the carrier includes entering only place specified digits of the carrier code for use by the algorithm.

5. The method of claim 1, wherein the step of programming the NAM on the carrier's network includes using a SID which corresponds to the carrier.

6. The method of claim 1, wherein the step of programming the NAM on the carrier's network includes using a SOC which corresponds to the carrier.

7. The method of claim 1, wherein the step of entering an entry sequence includes using a key sequence which permits the phone to identify a specific carrier.

8. The method of claim 7, wherein the key sequence identifies a carrier specific algorithm.

9. The method of claim 7, wherein the key sequence is #ID# and wherein #ID# identifies a specific carrier.

10. The method of claim 1, wherein the step of entering an entry sequence includes transmitting the unlock code to the cellular phone.

11. The method of claim 1, wherein the step of entering an entry sequence further includes the step of incrementing or decreasing a count and comparing that count to a fixed value, and if the fixed value is exceeded, disabling the cellular phone from any further NAM programming.

* * * * *